No. 834,914. PATENTED NOV. 6, 1906.
E. W. KRUSE & L. BOYD.
ATTACHMENT FOR LAWN RAKES.
APPLICATION FILED JULY 18, 1905.
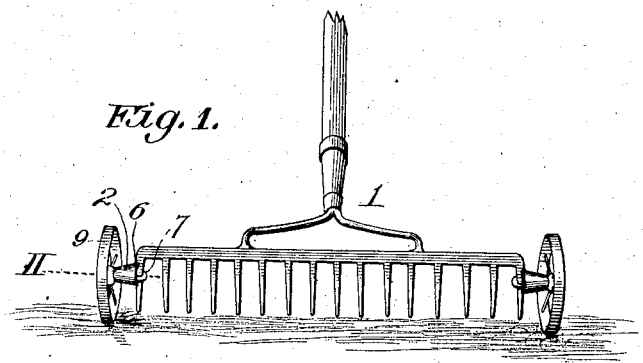
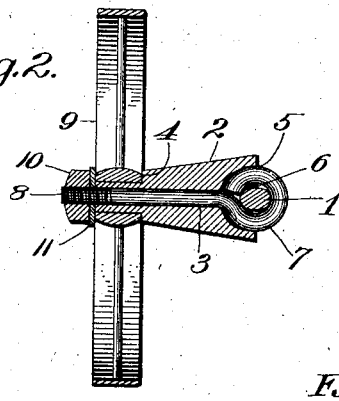
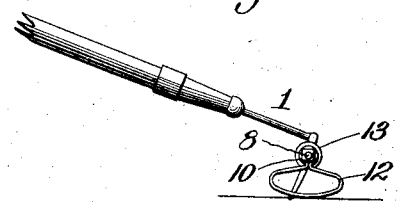
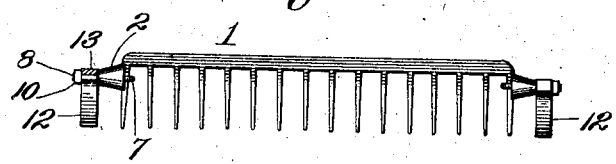
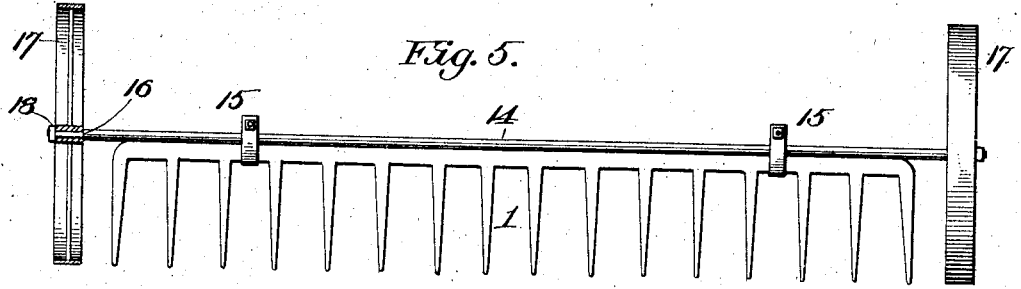
Witnesses
Frank R. Blow
H. C. Rodgers
Inventors
Leroy Boyd and E. W. Kruse
By George L. Loxpe
Atty.

UNITED STATES PATENT OFFICE.

EDWARD W. KRUSE AND LEROY BOYD, OF HIGGINSVILLE, MISSOURI.

ATTACHMENT FOR LAWN-RAKES.

No. 834,914.     Specification of Letters Patent.     Patented Nov. 6, 1906.

Application filed July 18, 1905. Serial No. 270,238.

*To all whom it may concern:*

Be it known that we, EDWARD W. KRUSE and LEROY BOYD, citizens of the United States, residing at Higginsville, in the county of Lafayette and State of Missouri, have invented certain new and useful Improvements in Attachments for Lawn-Rakes, of which the following is a specification.

Our invention relates to lawn-rakes, and more especially to attachments therefor for so supporting the teeth that their points shall not penetrate the soil and tear the sod while the lawn is being raked, our particular object being to produce attachments of the character outlined which can be easily and quickly secured to or removed from any of the ordinary rakes in common use and which will enable the operator to rake the lawn quickly and thoroughly with greater ease and convenience than with the ordinary lawn-rake.

With this object in view the invention consists in certain novel and peculiar features of construction, as hereinafter described and claimed, and in order that it may be fully understood reference is to be had to the accompanying drawings, in which—

Figure 1 is a perspective view of a lawn-rake equipped with attachments embodying our invention. Fig. 2 is a section on the dotted line I I of Fig. 1. Fig. 3 is a side view of a rake equipped with a modified form of the attachment. Fig. 4 is a front view of the construction shown in Fig. 3 with one of the attachments shown in vertical section. Fig. 5 is a view, partly in front elevation and partly in vertical section, of a second modified construction.

In the said drawings, 1 indicates a rake of a the type shown or of any other suitable or preferred type. In Figs. 1 and 2 the rake is provided with attachments constructed as follows: 2 indicates outwardly-tapering cones provided with axial passages 3, reduced at their outer ends to provide shoulders 4. At their inner ends said pins are provided with recesses 5, which form enlargements for the inner ends of the passages, and in vertical alinement the inner ends of the cones are notched, as at 6, to engage the end teeth of the rake. 7 indicates eyebolts with their eyes engaging said teeth and their stems extending through the cones and threaded at their outer ends, as at 8. 9 indicates wheels journaled on the reduced outer ends of the cones and bearing against the shoulders 4 thereof. 10 indicates clamping-nuts engaging the threaded ends of the eyebolts and clamping the washers 11 against the outer ends of the cones, the reduced portions of the cones being slightly longer than the hubs of the wheels in order that the latter shall be free to turn irrespective of the distance which the nuts are screwed upon the eyebolts, it being understood that by screwing said nuts tightly home upon the eyebolts the eyes of the latter clamp the end teeth of the rake tightly into the notches 6, and thus prevent turning movement of the cones. By this construction it is obvious the eyebolts are vertically adjustable on the rake-teeth in order that the wheels, without regard to their size, may be so disposed with relation to the rake that the teeth of the latter can never dig into the ground or into the roots of the grass unless the lawn is very irregular or uneven.

In Figs. 3 and 4 we provide attachments in which runners are substituted for the wheels, the runners being numbered 12, and having eyes 13 engaging the reduced portions of the cones, it being understood in this connection that the runners, or, rather, the eyes of the runners, shall slightly exceed the length of said reduced portions of the cones in order that when the nuts are screwed home they shall clamp the runners rigidly in place, and thus prevent them rocking or rotating on and independently of the cones. The only rocking movement that the runners will have will be that produced by raising or lowering the handle of the rake.

Referring now to Fig. 5, it will be seen that in lieu of the cones and eyebolts we secure a shaft 14 to the head of the rake by means of clamping-clips 15 of the type shown or of any other suitable or preferred type. The ends of the shaft project beyond the head of the rake and are provided with reduced extensions 16, upon which wheels 17 are journaled, retaining-nuts 18 engaging the ends of the shaft to hold said wheels reliably in place. In this connection the wheels are of materially greater diameter than in the construction shown in Figs. 1 and 2. In operation they perform the same function, of course.

From the above description it will be apparent that we have produced an attachment for lawn-rakes of simple, compact, and inexpensive construction which possesses the features of advantage enumerated as desirable.

Having thus described the invention, what we claim as new, and desire to secure by Letters Patent, is—

1. An attachment for lawn-rakes, comprising a pair of cones having axial passages and recesses at the inner ends of said axial passages and diametrically opposite notches opening into said recesses, eyebolts extending through said axial passages with their eyes projecting into the recesses and disposed at right angles to said notches, supports mounted upon the outer ends of the cones, and nuts engaging the outer ends of the bolts to retain the supports in place and clamp the eyes of said bolts against the bases of said recesses.

2. The combination with a lawn-rake, of an attachment, comprising a pair of cones having axial passages and recesses at the inner ends of said axial passages and diametrically opposite notches opening into said recesses, eyebolts extending through said axial passages with their eyes projecting into the recesses and disposed at right angles to said notches and embracing the outermost teeth of the rake, supports mounted upon the outer ends of the cones, and nuts engaging the outer ends of the bolts to retain the supports in place and clamp the cones and said rake-teeth tightly together with the latter engaging the notches of the former.

3. An attachment for lawn-rakes, comprising a pair of cones having axial passages and recesses at the inner ends of said axial passages and diametrically opposite notches opening into said recesses, eyebolts extending through said axial passages with their eyes projecting into the recesses and disposed at right angles to said notches, wheels journaled on the outer ends of the cones, and nuts engaging the outer ends of the bolts to retain the wheels in place and clamp the eyes of said bolts against the bases of said recesses.

4. The combination with a lawn-rake of an attachment, comprising a pair of cones having axial passages and recesses at the inner ends of said axial passages and diametrically opposite notches opening into said recesses, eyebolts extending through said axial passages with their eyes projecting into the recesses and disposed at right angles to said notches embracing the outermost teeth of the rake, wheels journaled on the outer ends of the cones, and nuts engaging the outer ends of the bolts to retain the wheels in place and clamp the cones and said rake-teeth tightly together with the latter engaging the notches of the former.

5. The combination with a lawn-rake, of a pair of cones having axial passages, recesses at the inner ends of such passages and notches opening into said recesses, and having their outer ends diametrically reduced, wheels journaled on said reduced portions and having hubs of slightly less length than said cones, eyebolts extending through said passages and provided with eyes at their inner ends embracing the end teeth of the rake, and having their outer ends threaded, washers mounted on said bolts at the outer sides of the wheels, and nuts engaging the threaded outer ends of the bolts and the outer sides of the washers and clamping the cones and end teeth of the rake firmly together with said teeth occupying the notches of the cones.

In testimony whereof we affix our signatures in the presence of two witnesses.

EDWARD W. KRUSE.
LEROY BOYD.

Witnesses:
PETER H. UPHAUS. [L. S.]
GEO. SCOTT. [L. S.]